(No Model.)

M. WEBER, J. PERSCHL & P. WEBER.
APPLIANCE FOR AND METHOD OF PLANTING SEED.

No. 526,512. Patented Sept. 25, 1894.

Witnesses.
P. W. Harbison
F. M. Townsend

Inventors:
Moritz Weber
Joseph Perschl
Pius Weber
By Hazard & Townsend
Their Attys.

United States Patent Office.

MORITZ WEBER, JOSEF PERSCHL AND PIUS WEBER, OF LOS ANGELES, CALIFORNIA.

APPLIANCE FOR AND METHOD OF PLANTING SEEDS.

SPECIFICATION forming part of Letters Patent No. 526,512, dated September 25, 1894.

Application filed December 1, 1893. Serial No. 492,416. (No model.)

*To all whom it may concern:*

Be it known that we, MORITZ WEBER and JOSEF PERSCHL, citizens of the United States, and PIUS WEBER, a citizen of Switzerland, all residents of Los Angeles, in the county of Los Angeles and State of California, have invented a new and useful Appliance for and Method of Planting Seeds, of which the following is a specification.

Heretofore the seeds of flowers, grass, &c., have been secured in place upon or between sheets of paper or other flexible material by means of paste or other adhesive substances so that when the mat or sheet is spread upon the ground and watered, the seeds will grow and the plants will occupy the positions relative to each other which is desired. Difficulty heretofore has arisen from the fact that the mats are thin and dry very quickly and the adhesive substance used is also liable to incase the seed in a shell which is impervious to air and thus the seed becomes devitalized if kept for any length of time and when planted, will fail to grow.

The object of our invention is to provide a device of this kind which will be of sufficient thickness to retain moisture for a considerable length of time, and which will fertilize the soil upon which the mat is spread, and within which the seeds may be secured without any coating of paste or other adhesive substances being placed upon the seed so that the seeds may remain within the mat without becoming devitalized, for as long a time as they would retain their vitality in an ordinary receptacle.

Our invention also comprises the method of seeding ground which consists in first, sowing the seeds upon a sheet of suitable material; second, attaching to the sheet the seeds sown thereupon, and third, spreading the sheet with the seeds attached thereto upon the spot to be seeded.

The accompanying drawings illustrate our invention.

Figure 1:
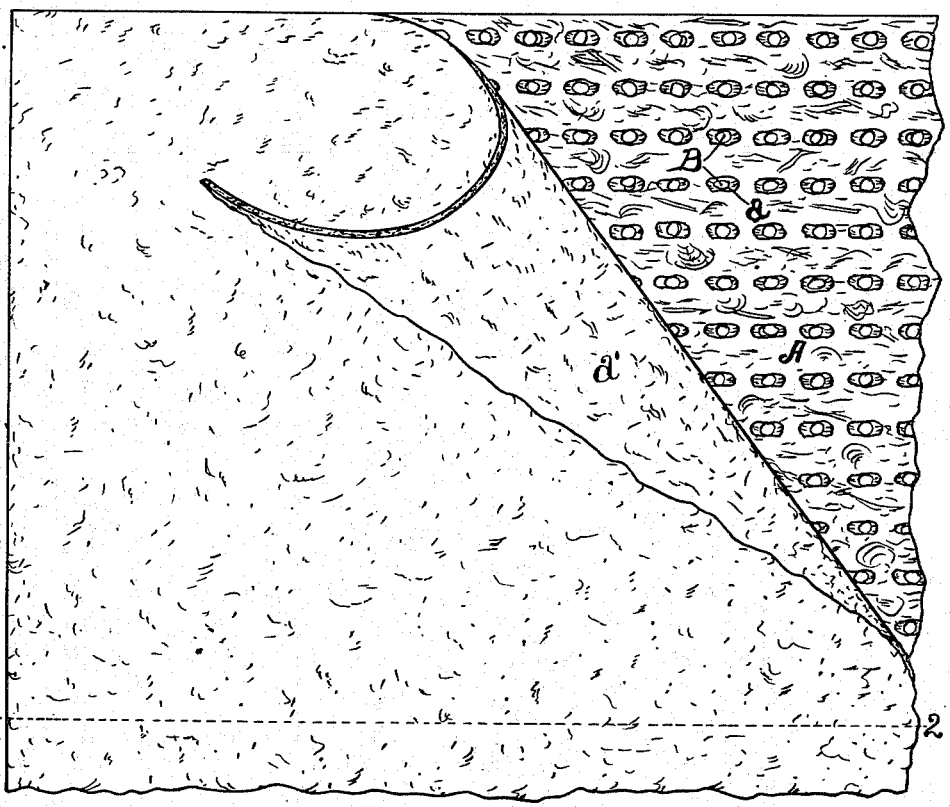
Figure 2:
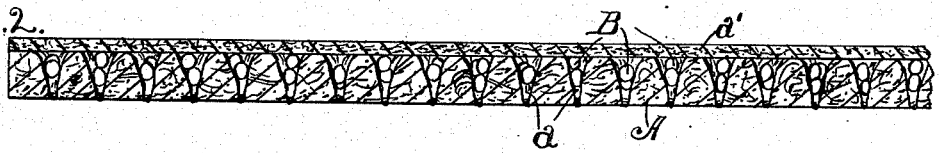

Figure 1 is an enlarged fragmental plan view of a mat prepared for seeding lawns according to our invention, the seed retaining cover being partially turned back in order to show the main body or matrix. Fig. 2 is a sectional view on line 2—2 Fig. 1. These views are enlarged about three times for clearness of illustration.

In practice the seed holding sheet or mat is made of some suitable fertilizer combined with some fibrous material which will hold the fertilizer in shape to form a sheet which will allow transportation and handling after being prepared for use.

Straw and manure may be used for forming the seed holding mat which may be made of any size and shape desired, either in lengths which may be rolled, or if found preferable it may be cut into squares or other shapes.

The body or matrix A of the sheet is of sufficient thickness to allow seed pockets or holes to be made in such body to receive the seeds B which are to be planted.

For use in planting lawns, the sheet may be about one eighth of an inch in thickness; and the seed pockets or holes about one-eighth of an inch apart and of a size to properly seed the ground which it is desired to plant.

$a$ represents a porous seed retaining cover which, in practice is fastened to the upper face of the seed planting mat A to cover the mouths of the seed pockets and to thus secure the seeds in the sheet. This cover may be made of the same material as the sheet A, but preferably more porous and open. The seed retaining pockets $a$ are preferably downwardly tapering or of an inverted cone shape and extend almost through the sheet as shown in Fig. 2 in order that air may be admitted into the pockets $a$ to prevent the seeds from losing vitality, in case the mat is stored for a considerable length of time after being prepared for use.

The perforations or seed pockets $a$ may be formed in the mat A by any suitable means, such for instance as by means of a roller (not shown) studded with pins or projections adapted to form when pressed into the body of the mat the seed pockets $a$; or the seed pockets may be formed by stamping the matrix A with a flat die studded with pins or projections, or by any other suitable means.

In practice it is designed that the sheets or mats be manufactured at one place in large quantities and the seeds B be sown upon the sheet in the seed pockets $a$ and secured therein by pasting or otherwise affixing the seed retaining cover $a'$ upon the top of the sheet to cover the mouths of the funnel shaped seed pockets.

For seeding lawns the sheet is prepared substantially as illustrated in the drawings, with the seed pockets about one-eighth of an inch apart. After being manufactured, the sheets are sold in quantities to nurserymen and seed dealers and are retailed to the public.

In practice the ground is prepared in the ordinary manner of preparing ground for planting and is made smooth. Then the sheet A with the seeds B attached thereto is spread upon the surface of the ground to cover the area which it is desired to seed. The sheets are then irrigated or sprinkled, and being of a porous nature, they absorb and retain water and also allow water to percolate through the mat into the ground. The sheet acts in the nature of a mulch and while germinating the seeds perfectly also retains the moisture in the ground beneath the mat and prevents the wild grass or weeds in the soil beneath the mat from growing, thus dispensing with much of the labor which is required to weed the lawns seeded in the ordinary manner. By extending the seed pockets $a$ entirely through the mat as shown in Fig. 2 the roots of the seeds find ready access through the mat into the ground therebelow. By making the mat of fertilizing matter the soil is enriched equally over the entire surface covered by the mat or sheet.

The seed pockets in the mat may be arranged in ornamental designs, and filled with flower seeds, thus to produce the design in relief, when the flowers have grown, and the seeds of plants of different varieties or colors may be at slight cost arranged in the seed pockets with such relation to each other as to produce intricate patterns in the flower bed when the plants are grown, thus enabling any one at slight cost to lay out his grounds in a highly ornamental and artistic manner.

In practice it may be found advantageous to cover the mats or sheets with a layer of manure or loose earth after spreading the sheets in position upon the spot to be planted, in order to retain the moisture in the sheet for a considerable length of time, even when the absorption of moisture by the air is very rapid.

Now, having described our invention, what we claim as new, and desire to secure by Letters Patent, is—

1. The seed mat set forth consisting of a thick sheet of fertilizing material provided with holes extending through the sheet and adapted to form seed pockets arranged to seat the seeds within the mat, and suitable means for retaining the seeds in the seed pockets.

2. The seed mat set forth consisting of a thick sheet of fertilizing material provided with tapering perforations extending through the sheet and adapted to form seed pockets to seat the seeds within the mat, and the thin seed retaining cover attached to the sheet and arranged to close the mouths of the seed pockets.

MORITZ WEBER.
JOSEF PERSCHL.
PIUS WEBER.

Witnesses:
JAMES R. TOWNSEND,
ALFRED I. TOWNSEND.